United States Patent
Dewitt et al.

(10) Patent No.: US 10,402,092 B2
(45) Date of Patent: Sep. 3, 2019

(54) RESIZING NAMESPACES FOR STORAGE DEVICES

(71) Applicant: Western Digital Technologies, Inc., Irvine, CA (US)

(72) Inventors: Dylan Mark Dewitt, Rochester, MN (US); Piyush Garg, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 70 days.

(21) Appl. No.: 15/170,106

(22) Filed: Jun. 1, 2016

(65) Prior Publication Data

US 2017/0351431 A1 Dec. 7, 2017

(51) Int. Cl.
*G06F 3/06* (2006.01)
*G06F 12/02* (2006.01)

(52) U.S. Cl.
CPC ............ *G06F 3/0605* (2013.01); *G06F 3/064* (2013.01); *G06F 3/0619* (2013.01); *G06F 3/0631* (2013.01); *G06F 3/0659* (2013.01); *G06F 3/0665* (2013.01); *G06F 3/0673* (2013.01); *G06F 12/0238* (2013.01); *G06F 12/0284* (2013.01); *G06F 12/0292* (2013.01); *G06F 2212/1032* (2013.01); *G06F 2212/651* (2013.01); *G06F 2212/657* (2013.01); *G06F 2212/7201* (2013.01); *G06F 2212/7205* (2013.01); *G06F 2212/7206* (2013.01)

(58) Field of Classification Search
CPC .... G06F 3/0605; G06F 3/0619; G06F 3/0631; G06F 3/064; G06F 3/0659; G06F 3/0665; G06F 12/0284; G06F 2212/1032; G06F 3/152; G06F 3/651; G06F 3/657; G06F 12/10; G06F 3/0673
See application file for complete search history.

(56) References Cited

U.S. PATENT DOCUMENTS

| | | | |
|---|---|---|---|
| 5,752,275 A * | 5/1998 | Hammond | G06F 12/1027 711/128 |
| 7,937,453 B1 | 5/2011 | Hayden et al. | |
| 8,738,621 B2 | 5/2014 | Hinrichs | |
| 9,003,071 B2 | 4/2015 | Liu | |
| 2008/0177809 A1* | 7/2008 | Murayama | G06F 3/0665 |
| 2010/0318760 A1* | 12/2010 | So | G06F 12/0246 711/173 |
| 2011/0137966 A1 | 6/2011 | Srinivasan et al. | |
| 2012/0084504 A1 | 4/2012 | Colgrove et al. | |

(Continued)

*Primary Examiner* — Mano Padmanabhan
*Assistant Examiner* — William E. Baughman
(74) *Attorney, Agent, or Firm* — Patterson & Sheridan, LLP; Steven Versteeg

(57) ABSTRACT

A method may include receiving, by a controller of a storage device and from a host device, a command to resize a first namespace of a plurality of namespaces stored in a non-volatile memory device of the storage device. The method may further include, relocating, by the controller, a physical block address for the non-volatile memory device from an entry in a virtual to physical table identified by a first index value to an entry in the virtual to physical table identified by a second index value, and in response to relocating the physical block address, updating, by the controller, a mapping, by a namespace table, to indicate an initial index value of a second namespace of the plurality of namespaces.

20 Claims, 4 Drawing Sheets

(56) References Cited

U.S. PATENT DOCUMENTS

| | | | |
|---|---|---|---|
| 2012/0137303 A1* | 5/2012 | Okada | G06F 3/0608 |
| | | | 718/104 |
| 2012/0203958 A1* | 8/2012 | Jones | G06F 12/0246 |
| | | | 711/103 |
| 2014/0006695 A1* | 1/2014 | Makuni | G06F 12/0246 |
| | | | 711/103 |
| 2014/0013045 A1* | 1/2014 | Crossland | G06F 12/0866 |
| | | | 711/105 |
| 2014/0223128 A1* | 8/2014 | Staudenmaier | G06F 11/1012 |
| | | | 711/163 |
| 2014/0330787 A1 | 11/2014 | Modukuri et al. | |
| 2015/0058539 A1 | 2/2015 | Huang | |
| 2015/0095555 A1 | 4/2015 | Asnaashari et al. | |
| 2016/0117115 A1* | 4/2016 | Mehra | G06F 3/0631 |
| | | | 711/112 |

* cited by examiner

RESIZING NAMESPACES FOR STORAGE DEVICES

TECHNICAL FIELD

The disclosure generally relates to storage devices, more specifically, providing namespaces for storage devices.

BACKGROUND

Namespaces in storage devices, such as solid state drives (SSDs) or hard disk drives (HDDs), provides each user, for his or her own use, a segregated physical storage containing different blocks that are mapped to identical logical block addresses (LBAs). For instance, blocks in different namespaces of the storage device may contain different data but, otherwise, have identical LBAs. Through use of the different contexts defined by namespaces, a host device may configure a single storage device as multiple discrete virtual storage devices. Although namespaces allow for virtual separation of a single storage device into multiple virtual storage devices, namespaces may be difficult to manage and maintain.

SUMMARY

In one example, a method includes receiving, by a controller of a storage device and from a host device, a command to resize a first namespace of a plurality of namespaces stored in a non-volatile memory device of the storage device. The method further includes, in response to receiving the command to resize the first namespace, relocating, by the controller, a physical block address for the non-volatile memory device from an entry in a virtual to physical table identified by a first index value to an entry in the virtual to physical table identified by a second index value, and in response to relocating the physical block address, updating, by the controller, a mapping, by a namespace table, to indicate an initial index value of a second namespace of the plurality of namespaces.

In another example, a storage device includes a storage element and a controller. The controller may be configured to receive, from a host device, a command to resize a first namespace of a plurality of namespaces stored in a non-volatile memory device of the storage device. In response to receiving the command to resize the first namespace, the controller may be configured to relocate a physical block address for the non-volatile memory device from an entry in a virtual to physical table identified by a first index value to an entry in the virtual to physical table identified by a second index value and in response to relocating the physical block address, update a mapping, by a namespace table, to indicate an initial index value of a second namespace of the plurality of namespaces.

In another example, a non-transitory computer-readable storage medium encoded with instructions that, when executed, cause one or more processors of a storage device to receive, from a host device, a command to resize a first namespace of a plurality of namespaces stored in a non-volatile memory device of the storage device. In response to receiving the command to resize the first namespace, the instructions cause the one or more processors of a storage device to relocate a physical block address for the non-volatile memory device from an entry in a virtual to physical table identified by a first index value to an entry in the virtual to physical table identified by a second index value and in response to relocating the physical block address, update a mapping, by a namespace table, to indicate an initial index value of a second namespace of the plurality of namespaces.

In another example, a system includes means for receiving, from a host device, a command to resize a first namespace of a plurality of namespaces stored in a non-volatile memory device of the storage device, means for relocating a physical block address for the non-volatile memory device from an entry in a virtual to physical table identified by a first index value to an entry in the virtual to physical table identified by a second index value, and means for updating a mapping, by a namespace table, to indicate an initial index value of a second namespace of the plurality of namespaces in response to relocating the physical block address.

The details of one or more examples are set forth in the accompanying drawings and the description below. Other features, objects, and advantages will be apparent from the description and drawings, and from the claims.

DETAILED DESCRIPTION

Various aspects of the techniques of this disclosure may enable a storage device to resize a namespace without data loss. For example, a storage device may assign, during an initial setup, a first namespace to a first set of index values of a virtual to physical (V2P) table and assign a second namespace a second set of index values of the virtual to physical table. Next, the storage device may add additional index values to the first namespace. When resizing the first namespace to add the additional index values, the storage device may shift the second namespace in the virtual to physical table to allow the additional index values to be assigned to the first namespace. The storage device may update a namespace table to reference to a new initial index value of the second namespace to account for the shifting of the second namespace in the virtual to physical table.

Moreover, some aspects of the techniques may tag data stored to indicate an index value, and if the index value of a tag does not match an index value corresponding to a stored location of the data, then the data may be considered stale and may be deleted. So, in some examples, the storage device may tag data with a namespace identifier indicating an entry in the namespace table to account for shifts in the virtual to physical table. In this way, storage devices may ensure that tags remain valid when resizing a namespace, which may enable a storage device to dynamically resize a namespace while maintaining data integrity.

Figure 1:
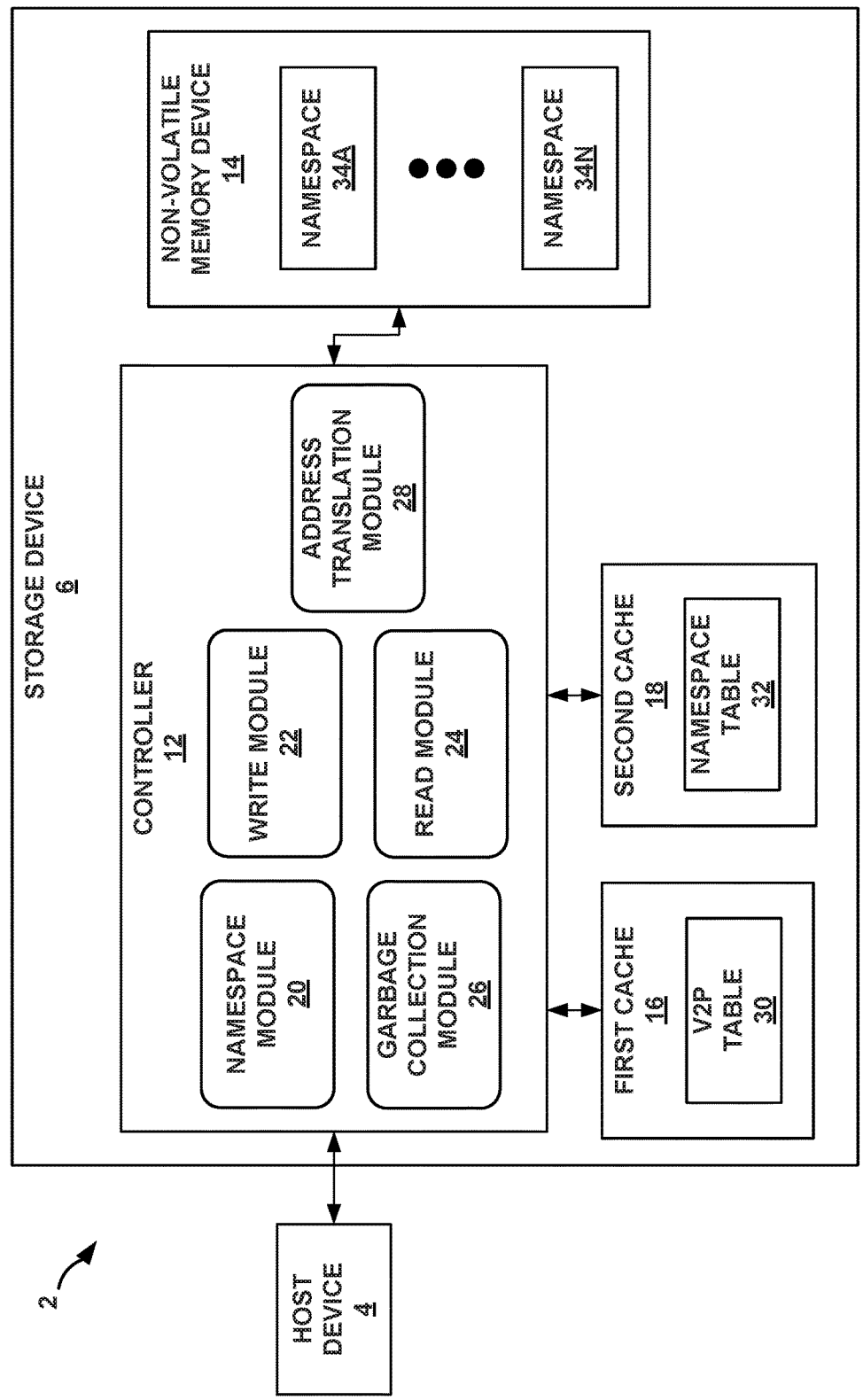
FIG. 1 is a conceptual and schematic block diagram illustrating an example storage environment in which a storage device may contain multiple namespaces, in accordance with one or more techniques of this disclosure.

FIG. 1 is a conceptual and schematic block diagram illustrating an example storage environment 2 in which storage device 6 may be configured to dynamically update multiple namespaces 34A-34N (collectively, "namespaces 34"), in accordance with one or more techniques of this disclosure. Storage environment 2 may include host device 4 connected to storage device 6.

Host device 4 may access namespaces 34 included in storage device 6 to store and retrieve data. Host device 4 may include any computing device, including, for example, a computer server, a network attached storage (NAS) unit, a desktop computer, a notebook (e.g., laptop) computer, a tablet computer, a set-top box, a mobile computing device such as a "smart" phone, a television, a camera, a display device, a digital media player, a video gaming console, a video streaming device, or the like. Host device 4 may include a processing unit, which may refer to any form of hardware capable of processing data and may include a general purpose processing unit (such as a central processing unit (CPU)), dedicated hardware (such as an application specific integrated circuit (ASIC)), configurable hardware such as a field programmable gate array (FPGA) or any other form of processing unit configured by way of software instructions, microcode, firmware, or the like.

Storage device 6 may provide host device 4 with access to data stored in namespaces 34. Storage device 6 may include controller 12, first cache 16, second cache 18, and non-volatile memory device 14. Controller 12 may represent one of or a combination of one or more of a microprocessor, digital signal processor (DSP), application specific integrated circuit (ASIC), field programmable gate array (FPGA), or other digital logic circuitry.

Non-volatile memory device 14 may include memory elements configured to store and/or retrieve data. For instance, non-volatile memory device 14 may include a group of memory elements in a channel to store data. In some examples, a channel may be multiplexed. For instance, memory elements grouped into a channel may be attached to a common I/O bus and a common control bus. In some examples, a channel may include a chip enable line which may be used to multiplex memory elements on the channel. In some examples, non-volatile memory device 14 may include multiple channels. For instance, non-volatile memory device 14 may include a first channel for a first group of memory elements having a set of connections (e.g., I/O bus, chip enable line, control bus, etc.) that may be independent to a second channel for a second group of memory elements. In some examples, non-volatile memory device 14 may be configured to store relatively large amounts of data (e.g., 256 MB, 512 MB, 1 GB, 2 GB, 4 GB, 8 GB, 16 GB, 32 GB, 64 GB, 128 GB, 256 GB, 512 GB, 1 TB, etc.).

Controller 12 may store virtual to physical table 30 to first cache 16. Virtual to physical table 30 may associate an index value with a physical block address of non-volatile memory device 14. First cache 16 may include volatile memory, non-volatile memory or a combination of volatile and non-volatile memory. Examples of first cache 16 include, but are not limited to, one of or a combination of one or more of random-access memory (RAM), static random access memory (SRAM), phase-change RAM, dynamic random access memory (DRAM), and synchronous dynamic RAM (SDRAM (e.g., DDR1, DDR2, DDR3, DDR3L, LPDDR3, DDR4, and the like).

Controller 12 may store namespace table 32 to second cache 18. Namespace table 32 may associate a namespace identifier with an initial index value of virtual to physical table 30. Second cache 18 may include non-volatile memory to provide persistent storage of namespace table 32. For instance, controller 12 may store namespace table 32 in a non-volatile memory of second cache 18 and, after a reset of storage device 6, controller 12 may retrieve namespace table 32 from second cache 18. Examples of non-volatile memory may include, but are not limited to, one of or a combination of one or more of SRAM, phase-change RAM, or the like. In some instances, second cache 18 may have a faster I/O speed than first cache 16. For instance, second cache 18 may include SRAM that performs a greater number of input/output operations per second than a DRAM of first cache 16. In some examples, first cache 16 and second cache 18 may be combined. For instance, first cache 16 and second cache 18 may be portions of a single memory device and/or an array of non-volatile memory.

Controller 12 may manage one or more operations of storage device 6. Controller 12 may include namespace module 20, write module 22, read module 24, garbage collection module 26, and address translation module 28.

Namespace module 20 may configure namespaces 34 such that a single memory may be separated into a set of virtual memories that appear as separate and distinct physical spaces or storage devices to host device 4. In some examples, namespace module 20 may associate the single memory to virtual memories using virtual to physical table 30. However, since data may also be tagged with mapping information for garbage collection, modifications in the virtual to physical table 30 may inadvertently mark data as stale, thereby resulting in data loss. So, namespace module 20 may reconfigure namespaces 34 using namespace table 32 such that each namespace of namespaces 34 may be dynamically resized without data loss. For instance, namespace module 20 may associate an initial index value of a namespace of namespaces 34 using namespace table 32. Then, data may be tagged with a namespace identifier and offset that account for modifications to the virtual to physical table 30. In this manner, namespace module 20 may permit namespaces 34 to be dynamically resized while preserving data.

Address translation module 28 may associate a logical block address with a physical block address of non-volatile memory device 14. For instance, address translation module 28 may receive a logical block address and a namespace identifier, and, using virtual to physical table 30 and namespace table 32, may determine a physical block address of non-volatile memory device 14 that corresponds with the logical block address and namespace identifier.

Write module 22 may receive commands from host device 4 to write data to a namespace of namespaces 34. For instance, write module 22 may receive, from host device 4, a command to write data to a logical block address and a namespace identifier associated with namespace 34A. Then, write module 22 may write the data to non-volatile memory device 14.

Read module 24 may receive commands from host device 4 to retrieve data from a namespace of namespaces 34. For instance, read module 24 may receive, from host device 4, a command to read data at a logical block address and a namespace identifier associated with namespace 34A. Then, read module 24 may retrieve the data from non-volatile memory device 14.

Garbage collection module 26 may relocate data sectors that contain valid data (e.g., not stale) to reclaim a blockset of data sectors. For instance, garbage collection module 26 may identify data sectors of a blockset that contain valid data using a tag stored in non-volatile memory device 14 and information stored in virtual to physical table 30 and namespace table 32. Then, garbage collection module 26 may cause read module 24 and write module 22 to relocate the data of data sectors that contain valid data.

As described above, controller 12 may configure namespaces 34 within non-volatile memory device 14 using virtual to physical table 30. After namespaces 34 are assigned, controller 12 may resize namespaces 34 by shifting index values of virtual to physical table 30. However, tags of data stored in non-volatile memory device 14 may not account for the shift in the index of virtual to physical table 30. As such, garbage collection techniques may incorrectly identify data stored in non-volatile memory device 14 as stale and delete the data, thereby resulting in data loss.

In accordance with the techniques described in this disclosure, namespace module 20 may resize a namespace in response to a command to resize the namespace from host device 4 without data loss. Rather than controller 12 directly assigning an initial index value of virtual to physical table 30 to a namespace of namespaces 34, namespace module 20 may instead assign a namespace identifier of namespace table 32 to the namespace. Namespace table 32 may map the namespace identifier to an initial index value of virtual to physical table 30. Additionally, rather than controller 12 tagging data to indicate an index value of virtual to physical table 30, namespace module 20 may tag data to indicate a namespace identifier of namespace table 32 and an offset. That is, garbage collection module 26 may determine whether data is stale based on the namespace identifier and offset, which accounts for resizing of namespaces 34, rather than an index value, which may not account for resizing of namespaces 34. In this manner, namespaces 34 may be resized without data loss.

For example, namespace module 20 may receive a command to resize a namespace in the form of a command to increase the size of the namespace. For instance, namespace module 20 may receive, from host device 4, a command to increase namespace 34A by 5 index values to permit namespace 34A to include up to 5 additional physical block addresses.

In some examples, namespace module 20 may receive a command to decrease a namespace from host device 4. For instance, namespace module 20 may receive, from host device 4, a command to decrease namespace 34B by 5 index values such that namespace 34A may include 5 fewer physical block addresses.

In response to receiving the command to resize a namespace, namespace module 20 may relocate a physical block address for non-volatile memory device 14 from an entry in virtual to physical table 30 identified by a first index value to an entry in virtual to physical table 30 identified by a second index value. For example, in response to namespace module 20 receiving a command from host device 4 instructing namespace module 20 to add a quantity of physical block addresses to a first set of contiguous index values for the first namespace, namespace module 20 may shift up (e.g., migrate each physical block address upward in virtual to physical table 30 from an entry identified by a lower index value to an entry identified by a higher index value) namespace 34B in virtual to physical table 30 such that the set of index values for namespace 34B permit adding the quantity of physical block addresses to the set of contiguous index values for namespace 34A. More specifically, namespace module 20 may move the set of index values for namespace 34B away from the set of index values for namespace 34A in virtual to physical table 30 by the number of index values added to namespace 34A of virtual to physical table 30. For instance, namespace module 20 may initially assign namespace 34A a set of index values (e.g., 0 to 19) of virtual to physical table 30 and assign namespace 34B a set of index values (e.g., 20 to 59) of virtual to physical table 30. Then, in response to a command to add 5 index values to namespace 34A, namespace module 20 may shift up the set of index values for namespace 34B to a second set of index values (e.g., 25 to 64) to permit adding the 5 index values to namespace 34A.

Similarly, namespace module 20 may receive a command from host device 4 instructing namespace module 20 to reduce a quantity of physical block addresses of a first set of contiguous index values for namespace 34A. For instance, namespace module 20 may reduce a quantity of physical block addresses of a set of contiguous index values for namespace 34A by shifting down namespace 34B in virtual to physical table 30. More specifically, namespace module 20 may move the set of index values for namespace 34B toward the set of index values for namespace 34A in virtual to physical table 30 by the number of index values subtracted from namespace 34A of virtual to physical table 30. For instance, namespace module 20 may shift the set of index values (e.g., 20 to 49) for namespace 34B down (e.g., migrating each physical block address downward in virtual to physical table 30 to correspond with a lower index value) to a second set of index values (e.g., 15 to 44) in virtual to physical table 30 by the number of index values subtracted (e.g. 5) from namespace 34A.

In response to relocating the physical block address, namespace module 20 may update a mapping in namespace table 32. For example, in response to namespace module 20 adding a quantity of index values to namespace 34A in virtual to physical table 30, namespace module 20 may update namespace table 32 to point to a new initial index value of namespace 34B. For instance, in response to namespace module 20 adding a quantity of 5 index values to namespace 34A in virtual to physical table 30, namespace module 20 may map, in namespace table 32, namespace 34B to an updated initial index value (e.g., 25) that is 5 index values higher than an initial index value (e.g., 20).

Similarly, in response to namespace module 20 reducing namespace 34A by a quantity of index values in virtual to physical table 30, namespace module 20 may update namespace table 32 to point to a new initial index value of namespace 34B. For instance, in response to namespace module 20 reducing a quantity of index values to namespace 34A in virtual to physical table 30 by 5 index values, namespace module 20 may map, in namespace table 32, namespace 34B to an updated initial index value (e.g., 15) that is 5 index values lower than an initial index value (e.g., 20). In this manner, namespace module 20 may update a mapping of namespace table 32 to permit resizing a namespace without data loss.

In some examples, a method may include receiving, by controller 12 of storage device 6 and from host device 4 a command to resize namespace 34A of namespaces 34 stored in non-volatile memory device 14 of storage device 6. The method may further include, in response to receiving the command to resize namespace 34A, relocating, by controller 12, a physical block address for non-volatile memory device 14 from an entry in virtual to physical table 30 identified by a first index value to an entry in virtual to physical table 30 identified by a second index value and in response to relocating the physical block address, updating, by controller 12, a mapping, by namespace table 32, to indicate an initial index value of namespace 34N of namespaces 34.

Figures 2, 3:
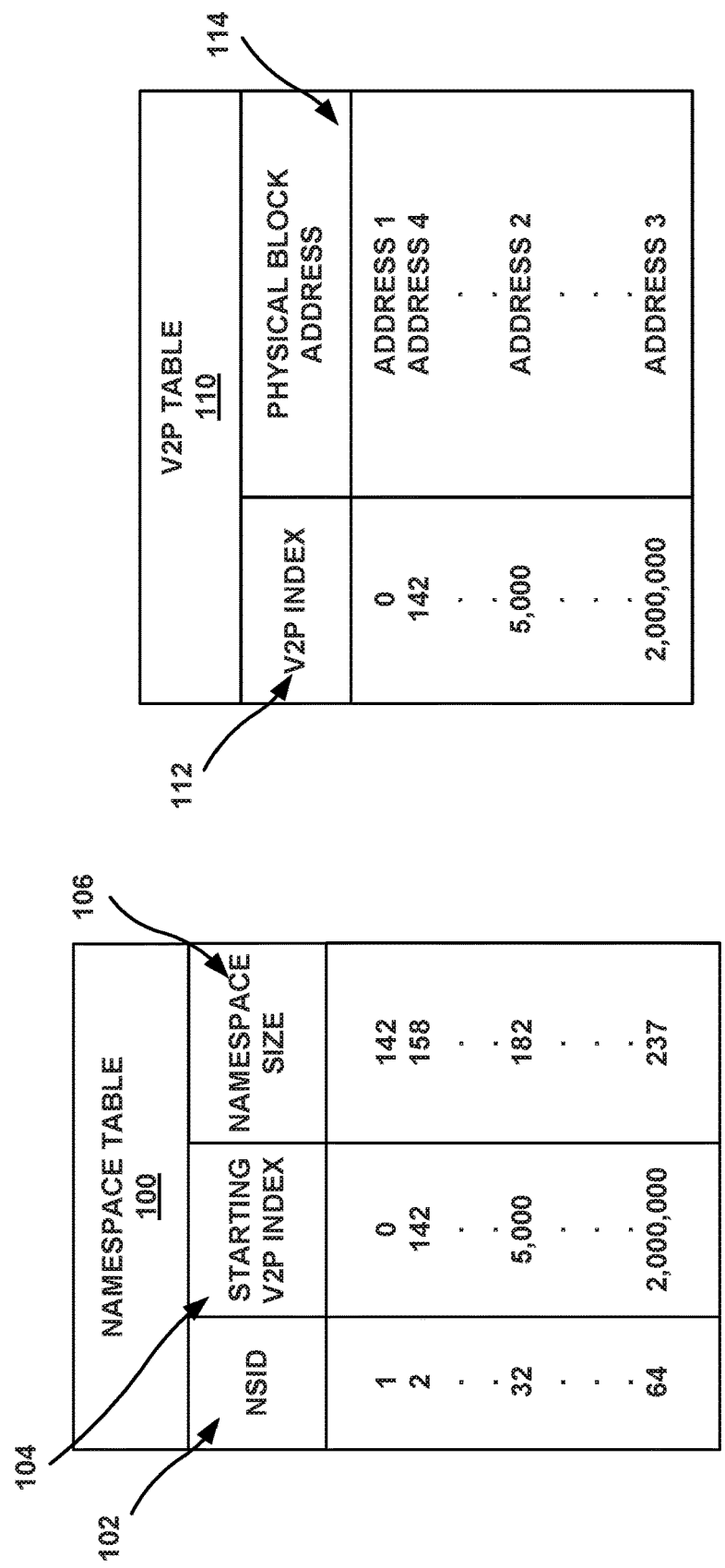
FIG. 2 is an example namespace table, in accordance with one or more techniques of this disclosure.
FIG. 3 is an example virtual to physical table, in accordance with one or more techniques of this disclosure.

FIG. 2 is an example namespace table 100, in accordance with one or more techniques of this disclosure. As shown, namespace table 100 may include a namespace identifier (NSID) 102 that is mapped, by namespace table 100, to a corresponding starting virtual to physical index value 104, and to a corresponding namespace size 106. For example, namespace table 100 may represent namespace 34A in NSID 102 as namespace identifier '1' and map, via namespace identifier '1', namespace 34A to a corresponding starting virtual to physical index value 104 of '0', and map, via namespace identifier '1', namespace 34A to a corresponding namespace size 106 of 142. In the example, namespace table 100 may represent namespace 34B in NSID 102 as namespace identifier '2' and map, via namespace identifier '2', namespace 34B to a corresponding starting virtual to physical index value 104 of '142', and map, via namespace identifier '2', namespace 34B to a corresponding namespace size 106 of 158. As shown, the exemplary namespace table 100 may include 64 namespace identifiers, but any suitable number of namespace identifiers may be used.

In some examples, namespace module 20 may configure namespace table 100 to permit dynamic resizing of one or more of namespaces 34 without data loss. For example, namespace module 20 may, during an initial setup, receive, from host device 4, an initial size for each of namespace 34. For instance, in response to namespace module 20 receiving a command from host device 4 instructing namespace module 20 to permit namespace 34A to include up to 100 physical block addresses, namespace module 20 generates namespace 34A with 100 index values. More specifically, namespace module 20 may assign namespace 34B an initial index value of 100 to permit namespace 34A to have a contiguous set of index values extending from 0 to 99. Then, in response to namespace module 20 receiving a command from host device 4 instructing namespace module 20 to resize namespace 34A to permit namespace 34A to include up to 142 physical block addresses, namespace module 20 may resize namespace 34A with 142 index values. More specifically, namespace module 20 may assign namespace 34B an initial index value of 142 to permit namespace 34A to have a contiguous set of index values extending from 0 to 141.

FIG. 3 is an example virtual to physical table 110, in accordance with one or more techniques of this disclosure. Virtual to physical table 110 may include a virtual to physical index 112 and physical block address 114, such as, for instance, a NAND address of non-volatile memory device 14. Each physical block address 114 of virtual to physical table 110 may be included in an entry of virtual to physical table 110 that may be identified by a corresponding virtual to physical index 112 of virtual to physical table 110. Said differently, an entry of virtual to physical table 110 may include physical block address 114 for a logical block address that is associated with virtual to physical index 112 of the entry.

Namespace module 20 may map a namespace using contiguous index values in virtual to physical table 110. For instance, namespace 34A may be assigned a contiguous set of index values starting at '0' and ending at '141'. The exemplary virtual to physical table 110 may assign namespace 34B a contiguous set of index values starting at '142'.

Namespace module 20 may map namespaces 34 to include abutting index values in virtual to physical table 110. For instance, namespace module 20 may assign namespace 34A a set of index values (e.g., 0 to 141) of virtual to physical table 110 and assign namespace 34B a set of index values (e.g., 142 to 300) of virtual to physical table 110. In the example, the set of index values of namespace 34A may have a final index value (e.g., 141) abutting an initial index value (e.g., 142) of the set of index values of namespace 34B.

In some examples, an index value may be an intermediate index value that is not assigned to namespaces 34. For instance, the exemplary virtual to physical table 110 may assign namespace 34A a contiguous set of index values ending at '141' such that namespace 34A may be increased by one index value without shifting entries in virtual to physical table 110.

Namespace module 20 may map namespaces 34 with one or more intermediate index values between namespaces 34 with virtual to physical table 110. For instance, namespace module 20 may assign namespace 34A a set of index values (e.g., 0 to 130) of virtual to physical table 110 and assign namespace 34B a set of index values (e.g., 142 to 300) of virtual to physical table 110. In the example, the set of index values of namespace 34A may have a final index value (e.g., 130) that is spaced apart from an initial index value (e.g., 142) of the set of index values of namespace 34B by intermediate index values (e.g., 131-141). In this manner, namespaces 34 may be resized without changes to namespace table 32. For instance, namespace module 20 may resize namespace 34A to include a second set of index values (e.g., 0 to 141) of virtual to physical table 110 while maintaining the assigned namespace 34B to include the original set of index values (e.g., 142 to 300) of virtual to physical table 110.

In some examples, namespace module 20 may determine whether to shift one or more physical block addresses in virtual to physical table 110. For example, namespace module 20 may determine whether to relocate a physical block address for non-volatile memory device 14 from an entry in virtual to physical table 110 identified by a first index value to an entry in virtual to physical table 110 identified by a second index value based on whether an intermediate index value separates namespaces 34. For instance, namespace module 20 may determine not to relocate the physical block address in virtual to physical table 110 if there are a sufficient number of intermediate index values to accommodate the command to resize. For instance, in response to a command to increase namespace 34A by 1 index value and namespace module 20 determining that 1 intermediate index value separates namespace 34A and namespace 34B, namespace module 20 may determine not to shift physical block addresses in virtual to physical table 110. On the other hand, namespace module 20 may determine to shift one or more physical block addresses in virtual to physical table 110 if intermediate values do not permit the resizing of namespaces 34 without data loss (e.g., a quantity of intermediate index values is less than a quantity of index values added).

Namespace module 20 may disallow read and write commands during a resize to ensure a safety of media accesses concurrent to the namespace resizing operation. For instance, namespace module 20 may determine whether one or more physical block addresses are being shifted (e.g., upward, downward, etc.) in virtual to physical table 110, and in response to determining that at least one of the physical block addresses is being shifted in virtual to physical table 110, namespace module 20 may prevent read module 24 from responding to read commands (e.g., reading data stored in non-volatile memory device 14) and write module 22 from responding to write commands (e.g., writing data to non-volatile memory device 14). Then, in response to the namespace module 20 determining that none of the physical block address are being shifted in virtual to physical table 110, namespace module 20 may permit read module 24 to respond to read commands and write module 22 to respond to write commands.

Namespace module 20 may move entries within virtual to physical table 110 one namespace at a time and block out read and write access to the namespace being moved while the namespace is being moved. For instance, namespace module 20 may move entries within virtual to physical table 110 for namespace 34B and block out access to namespace 34B while namespace 34B is being moved. In this manner, namespace module 20 may ensure a data validity of media accesses concurrent to the namespace resizing operation while permitting some read and write access.

Namespace module 20 may move entries within virtual to physical table 110 of a portion of one namespace at a time and block out read and write access to the portion of the namespace being moved while the portion of namespace is being moved. For instance, namespace module 20 may move a portion of entries within virtual to physical table 110 for namespace 34B and block out access to the portion of namespace entries of namespace 34B while the portion of namespace 34B is being moved. More specifically, namespace module 20 may store in namespace table 100 an old initial index value and a new initial index value to permit access to data while a portion of a namespace is being moved. For instance, during a grow operation, namespace module 20 may use the old initial index value (e.g., 142) for all entries below the portion being moved, and may use the new initial index (e.g., 150) for all entries above the portion being moved. In this manner, namespace module 20 may ensure a safety of media accesses concurrent to the namespace resizing operation with a minimal restriction to media access.

Namespace module 20 may verify that an index value for a namespace is within a range of index values for the namespace in order to avoid corrupting other areas of virtual to physical table 110. For instance, namespace module 20 may prevent writing namespace 34A at index value 142 of virtual to physical table 110 if namespace table 100 indicates that namespace 34B starts at index value 142 of virtual to physical table 110. In this manner, controller 12 may ignore write requests that are outside a range of index values for the namespace.

Figure 4:
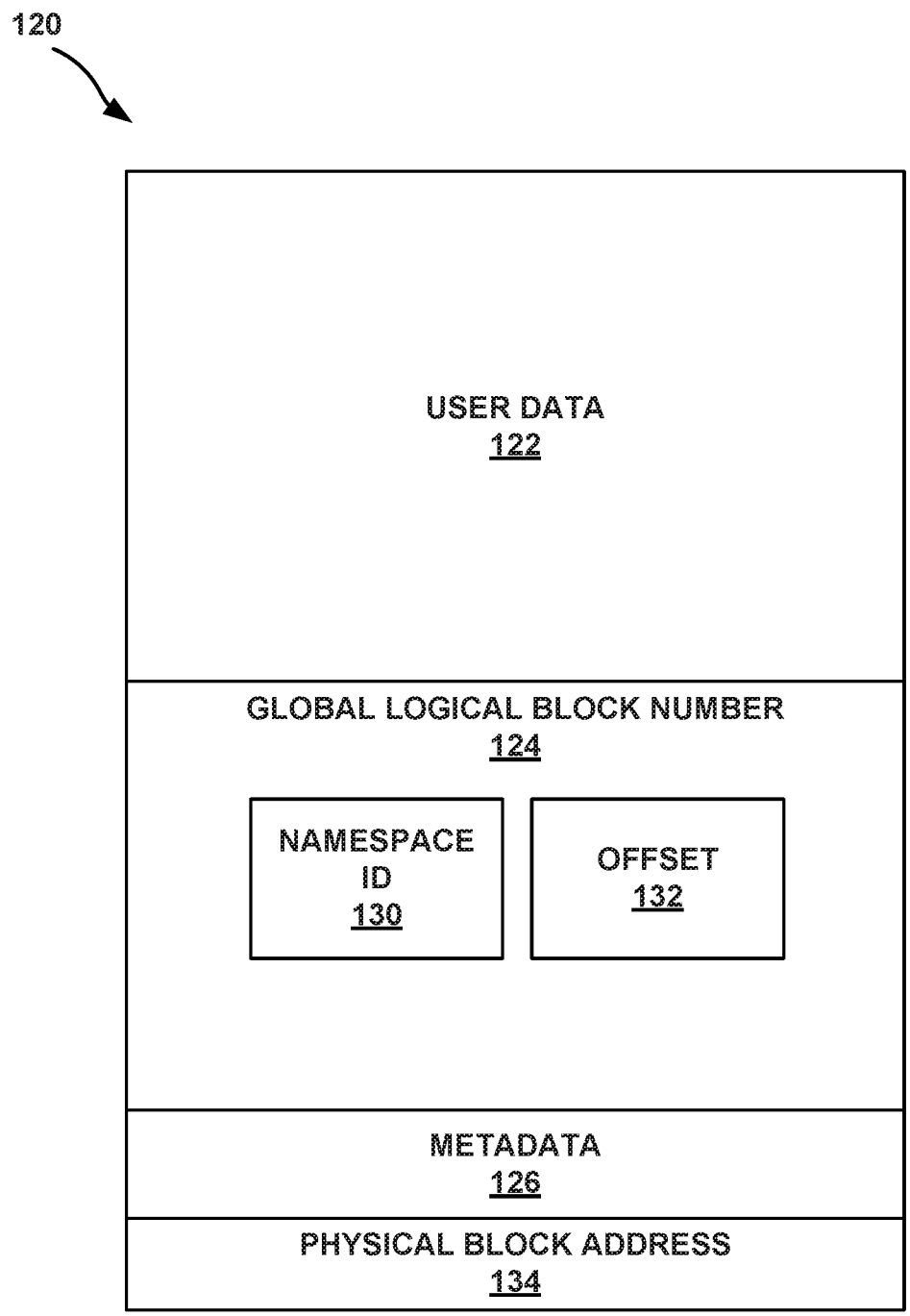
FIG. 4 is a conceptual representation of an example user data on physical media, in accordance with one or more techniques of this disclosure.

FIG. 4 is a conceptual representation of example user data 120 on physical media, in accordance with one or more techniques of this disclosure. FIG. 4 will be described with concurrent reference to storage environment 2 of FIG. 1 for ease of description. As shown, example data 120 may include user data 122, global logical block number 124, and metadata 126. User data 122 may refer to data that can be accessed by host device 4. Global logical block number 124 may be used to determine whether user data 122 is valid. For instance, garbage collection module 26 may determine that example data 120 is valid (e.g., not stale) if a physical block address (e.g., physical block address 114 in virtual to physical table 110 of FIG. 3) as indicated by namespace identifier 130 and offset 132 matches physical block address 134 of example data 120. Metadata 126 may include any suitable information, for instance, a timestamp.

In some examples, controller 12 may determine an index value of virtual to physical table 30 for example data 120 using namespace identifier 130 and offset 132. For example, garbage collection module 26 may determine an index value of virtual to physical table 30 by determining a base index value using namespace table 32 and namespace identifier 130. More specifically, garbage collection module 26 may look up an index value that is mapped, by namespace table 32, to namespace identifier 130. Then, garbage collection module 26 may add offset 132 to the base index value to determine an index value of virtual to physical table 30. In this manner, garbage collection module 26 may determine whether example data 120 is stale. For instance, garbage collection module 26 may look up a physical block address (e.g., physical block address 114 in virtual to physical table 110 of FIG. 3) mapped, by virtual to physical table 30, to the determined index value, and may determine that example data 120 is stale if the physical block address mapped to the determined index value is different from physical block address 134 of example data 120.

Figure 5:
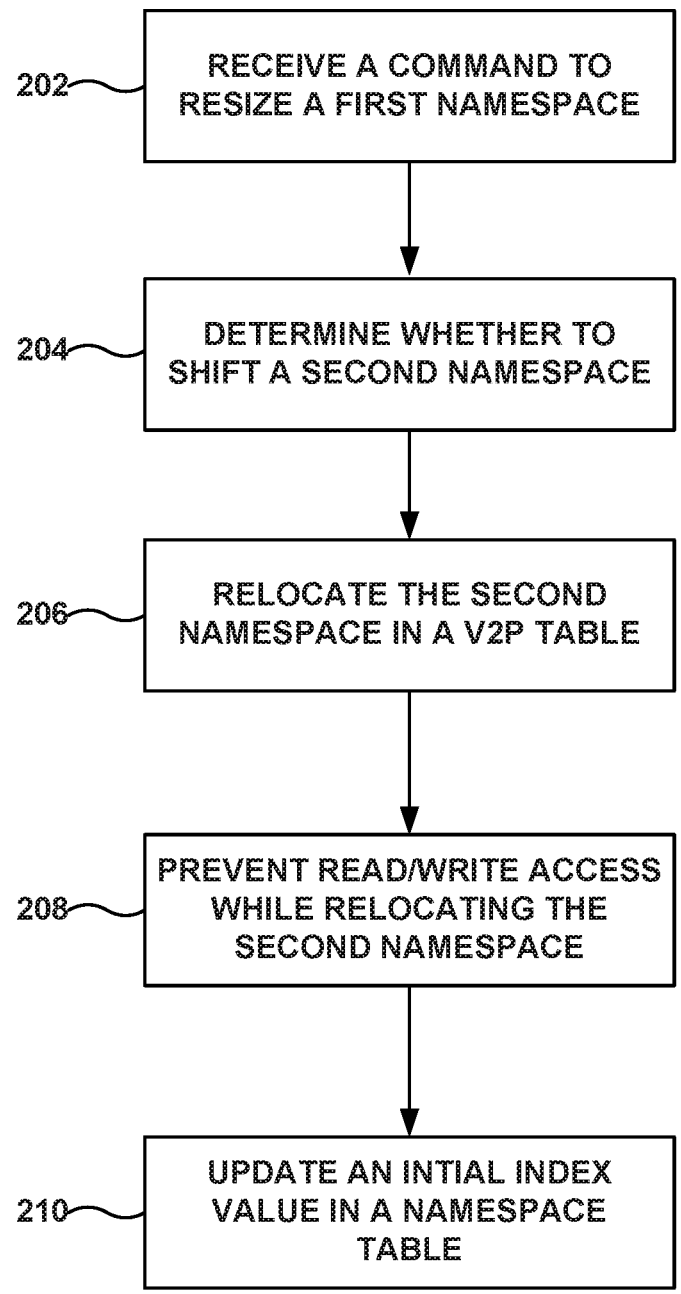
FIG. 5 is a flow diagram illustrating an example technique that at least one processor may implement for resizing a namespace, in accordance with one or more techniques of this disclosure.

FIG. 5 is a flow diagram illustrating an example technique that at least one processor may implement for resizing a namespace, in accordance with one or more techniques of this disclosure. The technique of FIG. 5 will be described with concurrent reference to storage environment 2 of FIG. 1 for ease of description.

Namespace module 20 may receive a command to resize a first namespace (202). For instance, host device 4 may send a command to storage device 6 to increase or decrease a number of index values assigned to namespace 34A by virtual to physical table 30. It should be understood that, in some examples, first namespace may refer to a namespace positioned in an initial position of namespace table 32 (e.g., NSID 1) and second namespace may refer to a namespace subsequent to the first namespace (e.g., NSID 2, NSID 3, and so on), however, in other examples, first namespace may refer to a namespace positioned in another position of virtual to physical table 30 (e.g., NSID 2, NSID 3, and so on) and second namespace may refer to a namespace that is positioned, in virtual to physical table 30 prior to or subsequent to the first namespace. Next, namespace module 20 may determine whether to shift a second namespace (204) in virtual to physical table 30. For instance, if the command was to increase the number of index values assigned to namespace 34A, namespace module 20 may determine whether one or more intermediate index values spacing apart a set of index values for namespace 34A from a set of index values for namespace 34B permit increasing namespace 34A. If the one or more intermediate index values permit increasing namespace 34, then namespace module 20 may increase namespace 34A without relocating index values in virtual to physical table 30. For instance, namespace module 20 may assign at least a portion of the one or more intermediate index values to namespace 34A. In some instances, if the command was to decrease the number of index values assigned to namespace 34A, namespace module 20 may assign at least a portion of namespace 34A as intermediate index values to decrease the number of index values assigned to namespace 34A. If namespace module 20 determines not to shift index values in virtual to physical table 30, the process may stop.

On the other hand, if namespace module 20 determines to shift index values in virtual to physical table 30, namespace module 20 may relocate the second namespace in virtual to physical table 30 (206). For instance, namespace module 20 may shift up physical block addresses associated with namespace 34B, by virtual to physical table 30, to permit increasing a number of index values assigned to namespace 34A. In some instances, namespace module 20 may shift down physical block addresses associated with namespace 34B, by virtual to physical table 30, to decrease a number of index values assigned to namespace 34A. While relocating the physical block addresses in virtual to physical table 30, namespace module 20 may prevent read/write access (208). For instance, namespace module 20 may block out access to namespace 34B while namespace 34B is being moved. Next, namespace module 20 may update an initial index value in namespace table 32 (210). For instance, namespace module 20 may update namespace table 32 to point to a new initial index value of namespace 34B to account for the shifting up (or down) of namespace 34B in virtual to physical table 30.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   receiving, by a controller of a storage device and from a host device, a command to resize a first namespace of a plurality of namespaces stored in a non-volatile memory device of the storage device; and
   in response to receiving the command to resize the first namespace:
      relocating, by the controller, a physical block address for the non-volatile memory device from an entry in a virtual to physical table identified by a first index value to an entry in the virtual to physical table identified by a second index value, wherein the relocating includes moving the entire physical block address; and
      in response to relocating the physical block address, updating, by the controller, a mapping, by a namespace table, to indicate an initial index value of a second namespace of the plurality of namespaces to include abutting index values in the virtual to physical table, wherein the namespace table and the virtual to physical table are separate tables, wherein the namespace table includes a namespace identifier that is mapped, by the namespace table, to a corresponding starting virtual to physical index value and to a corresponding namespace size, and wherein each of the namespace sizes represents a specific and separate entry in the namespace table.

2. The method according to claim 1, wherein:
   the first namespace is associated with a first set of contiguous index values of the virtual to physical table; and
   the second namespace is associated with a second set of contiguous index values of the virtual to physical table, the second set of contiguous index values starting with the initial index value indicated by the second table after relocating the physical block address.

3. The method according to claim 2, wherein:
   the command to resize indicates adding a quantity of physical block addresses to the first set of contiguous index values for the first namespace, and
   relocating the physical block address comprises moving the second set of contiguous index values for the second namespace within the virtual to physical table away from the first contiguous index values to permit adding the quantity of physical block addresses to the first set of contiguous index values for the first namespace.

4. The method according to claim 3, comprising:
   determining, by the controller, whether one or more intermediate index values in the virtual to physical table permit adding the quantity of physical block addresses to the first set of contiguous index values for the first namespace,
   wherein the one or more intermediate index values are positioned between the first set of contiguous index values and the second set of contiguous index values, and
   wherein relocating the physical block address is in response to determining that the one or more intermediate index values in the virtual to physical table do not permit adding the quantity of physical block addresses to the first set of contiguous index values for the first namespace.

5. The method according to claim 2, wherein:
   the command to resize indicates reducing a quantity of physical block addresses of the first set of contiguous index values for the first namespace, and
   relocating the physical block address comprises moving the second set of contiguous index values for the second namespace within the virtual to physical table towards the first contiguous index values.

6. The method according to claim 2, wherein relocating the physical block address comprises:
    moving, by the controller, the second set of contiguous index values for the second namespace within the virtual to physical table from a corresponding set of index values of the virtual to physical table to another corresponding set of index values of the virtual to physical table; and
    preventing, by the controller, access to read and write to the second namespace while moving the second set of contiguous index values for the second namespace within the virtual to physical table.

7. The method according to claim 1, wherein data stored at a physical block address of the non-volatile memory device of the storage device includes a tag indicating the namespace identifier and an offset, the method further comprising:
    determining, by the controller, an index value of the virtual to physical table corresponding with the physical block address by:
        determining, by the controller, a base index value for the physical block address using the namespace table and the namespace identifier indicated in the tag; and
        adding, by the controller, the offset to the base index value.

8. The method according to claim 1, wherein:
    the virtual to physical table is stored in a first memory of the controller,
    the namespace table is stored in a second memory of the controller, and
    the second memory of the controller has a faster input/output speed than the first memory.

9. A storage device comprising:
    a storage element; and
    a controller configured to:
        receive, from a host device, a command to resize a first namespace of a plurality of namespaces stored in a non-volatile memory device of the storage device; and
        in response to receiving the command to resize the first namespace:
            relocate a physical block address for the non-volatile memory device from an entry in a virtual to physical table identified by a first index value to an entry in the virtual to physical table identified by a second index value, wherein the relocating includes moving the entire physical block address; and
            in response to relocating the physical block address, update a mapping, by a namespace table, to indicate an initial index value of a second namespace of the plurality of namespaces to include abutting index values in the virtual to physical table, wherein the namespace table and the virtual to physical table are separate tables, wherein the namespace table includes a namespace identifier that is mapped, by the namespace table, to a corresponding starting virtual to physical index value and to a corresponding namespace size, and wherein each of the namespace sizes represents a specific and separate entry in the namespace table.

10. The storage device of claim 9, wherein:
    the first namespace is associated with a first set of contiguous index values of the virtual to physical table; and
    the second namespace is associated with a second set of contiguous index values of the virtual to physical table, the second set of contiguous index values starting with the initial index value indicated by the second table after relocating the physical block address.

11. The storage device of claim 10, wherein:
    the command to resize indicates adding a quantity of physical block addresses to the first set of contiguous index values for the first namespace, and
    the controller is further configured to move the second set of contiguous index values for the second namespace within the virtual to physical table away from the first contiguous index values to permit adding the quantity of physical block addresses to the first set of contiguous index values for the first namespace.

12. The storage device of claim 11, wherein:
    the controller is further configured to determine whether one or more intermediate index values in the virtual to physical table permit adding the quantity of physical block addresses to the first set of contiguous index values for the first namespace,
    the one or more intermediate index values are positioned between the first set of contiguous index values and the second set of contiguous index values, and
    relocating the physical block address is in response to determining that the one or more intermediate index values in the virtual to physical table do not permit adding the quantity of physical block addresses to the first set of contiguous index values for the first namespace.

13. The storage device of claim 10, wherein:
    the command to resize indicates reducing a quantity of physical block addresses of the first set of contiguous index values for the first namespace, and
    the controller is further configured to move the second set of contiguous index values for the second namespace within the virtual to physical table towards the first contiguous index values.

14. The storage device of claim 10, wherein the controller is further configured to:
    move the second set of contiguous index values for the second namespace within the virtual to physical table from a corresponding set of index values of the virtual to physical table to another corresponding set of index values of the virtual to physical table; and
    prevent access to read and write to the second namespace while moving the second set of contiguous index values for the second namespace within the virtual to physical table.

15. The storage device of claim 9, wherein:
    data stored at a physical block address of the non-volatile memory device of the storage device includes a tag indicating the namespace identifier and an offset, and
    the controller is further configured to:
        determine an initial index value for the physical block address using the namespace table and the namespace identifier indicated in the tag; and
        add the offset to the initial index value to determine an index value of the virtual to physical table corresponding with the physical block address.

16. The storage device of claim 9, wherein:
    the virtual to physical table is stored in a first memory of the controller,
    the namespace table is stored in a second memory of the controller, and
    the second memory of the controller has a faster input/output speed than the first memory.

17. A non-transitory computer-readable storage medium encoded with instructions that, when executed, cause one or more processors of a storage device to:
- receive, from a host device, a command to resize a first namespace of a plurality of namespaces stored in a non-volatile memory device of the storage device; and
- in response to receiving the command to resize the first namespace:
  - relocate a physical block address for the non-volatile memory device from an entry in a virtual to physical table identified by a first index value to an entry in the virtual to physical table identified by a second index value, wherein the relocating includes moving the entire physical block address; and
  - in response to relocating the physical block address, update a mapping, by a namespace table, to indicate an initial index value of a second namespace of the plurality of namespaces to include abutting index values in the virtual to physical table, wherein the namespace table and the virtual to physical table are separate tables, wherein the namespace table includes a namespace identifier that is mapped, by the namespace table, to a corresponding starting virtual to physical index value and to a corresponding namespace size, and wherein each of the namespace sizes represents a specific and separate entry in the namespace table.

18. The non-transitory computer-readable storage medium of claim 17, wherein:
- the first namespace is associated with a first set of contiguous index values of the virtual to physical table; and
- the second namespace is associated with a second set of contiguous index values of the virtual to physical table, the second set of contiguous index values starting with the initial index value indicated by the second table after relocating the physical block address.

19. A system comprising:
- means for receiving, from a host device, a command to resize a first namespace of a plurality of namespaces stored in a non-volatile memory device of a storage device;
- means for relocating a physical block address for the non-volatile memory device from an entry in a virtual to physical table identified by a first index value to an entry in the virtual to physical table identified by a second index value, wherein the relocating includes moving the entire physical block address; and
- means for updating a mapping, by a namespace table, to indicate an initial index value of a second namespace of the plurality of namespaces in response to relocating the physical block address to include abutting index values in the virtual to physical table, wherein the namespace table and the virtual to physical table are separate tables, wherein the namespace table includes a namespace identifier that is mapped, by the namespace table, to a corresponding starting virtual to physical index value and to a corresponding namespace size, and wherein each of the namespace sizes represents a specific and separate entry in the namespace table.

20. The system of claim 19, further comprising:
- means for preventing access to read and write to the second namespace while relocating the physical block address.

* * * * *